US011972891B2

(12) United States Patent
Miyoshi et al.

(10) Patent No.: US 11,972,891 B2
(45) Date of Patent: Apr. 30, 2024

(54) INDUCTOR COMPONENT

(71) Applicant: Murata Manufacturing Co., Ltd., Kyoto-fu (JP)

(72) Inventors: Hiromi Miyoshi, Nagaokakyo (JP); Yasuo Matsumoto, Nagaokakyo (JP); Kenta Kondo, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 754 days.

(21) Appl. No.: 17/103,604

(22) Filed: Nov. 24, 2020

(65) Prior Publication Data

US 2021/0175005 A1 Jun. 10, 2021

(30) Foreign Application Priority Data

Dec. 5, 2019 (JP) ................................ 2019-220382

(51) Int. Cl.
*H01F 27/28* (2006.01)
*H01F 27/32* (2006.01)
*H01F 41/04* (2006.01)
*H01F 41/12* (2006.01)

(52) U.S. Cl.
CPC ....... *H01F 27/2804* (2013.01); *H01F 27/323* (2013.01); *H01F 41/041* (2013.01); *H01F 41/122* (2013.01); *H01F 2027/2809* (2013.01)

(58) Field of Classification Search
CPC .. H01F 27/2804; H01F 27/323; H01F 41/041; H01F 41/122; H01F 2027/2809; H01F 17/02; H01F 17/0013; H01F 27/324; H01F 2017/002
USPC ........................................ 336/200, 232, 192
See application file for complete search history.

(56) References Cited

U.S. PATENT DOCUMENTS

| | | | | |
|---|---|---|---|---|
| 2013/0169381 A1* | 7/2013 | Kim | B32B 37/24 156/253 |
| 2017/0169930 A1* | 6/2017 | Kudo | H01F 17/0013 |
| 2017/0200554 A1* | 7/2017 | Kudo | H01F 27/36 |
| 2020/0303110 A1* | 9/2020 | Sato | H01F 17/0013 |
| 2020/0303117 A1* | 9/2020 | Sato | H01F 27/2804 |

FOREIGN PATENT DOCUMENTS

| | | |
|---|---|---|
| CN | 101896982 A | 11/2010 |
| CN | 107039144 A | 8/2017 |
| CN | 111724974 A | 9/2020 |
| JP | 2007-027665 A | 2/2007 |
| JP | 2007-123866 A | 5/2007 |
| JP | 2013-135134 A | 7/2013 |
| JP | 2014-007187 A | 1/2014 |
| JP | 2014-022714 A | 2/2014 |
| JP | 2018-026541 A | 2/2018 |
| JP | 2019-192824 A | 10/2019 |

* cited by examiner

*Primary Examiner* — Bickey Dhakal
*Assistant Examiner* — Kazi S Hossain
(74) *Attorney, Agent, or Firm* — Studebaker & Brackett PC

(57) ABSTRACT

An inductor component includes a lamination of an insulating layer and a conductive layer. The insulating layer includes a base made of glass and inorganic particles dispersed in the base. Some of the inorganic particles partially project through the surface of the base into the conductive layer.

9 Claims, 3 Drawing Sheets

INDUCTOR COMPONENT

CROSS-REFERENCE TO RELATED APPLICATION

This application claims benefit of priority to Japanese Patent Application No. 2019-220382, filed Dec. 5, 2019, the entire content of which is incorporated herein by reference.

BACKGROUND

Technical Field

The present disclosure relates to an inductor component.

Background Art

An inductor component described in Japanese Unexamined Patent Application Publication No. 2007-123866 includes a conductive layer laminated on a surface of a substrate and an insulating layer laminated on a surface of the conductive layer. The substrate has a surface roughness at or above a set value determined in accordance with the thickness of the conductive layer and the internal stress. The surface of the conductive layer on the insulating layer also has a surface roughness at or above a certain degree reflecting the surface roughness of the substrate. Because the surface of the insulating layer on the conductive layer has a shape following the surface of the conductive layer, the surface roughness of the surface of the insulating layer on the conductive layer also has a value corresponding to the surface roughness of the surface of the conductive layer on the insulating layer.

In the inductor component described in the above-mentioned present document, the surface roughness of the substrate reflects the surface of the conductive layer, the surface roughness of that conductive layer reflects the insulating layer, and that merely results in the state in which the surface roughness of the insulating layer on the conductive layer is at or above a certain degree. The above-mentioned Patent Document describing the inductor component, however, does not disclose any technique of roughening the surface of the insulating layer independently of the surface roughness of the substrate.

SUMMARY

Accordingly, the present disclosure can provide an inductor component including a lamination of an insulating layer and a conductive layer. The insulating layer includes a base made of an insulating material and inorganic particles dispersed in the base, with at least some of the inorganic particles partially projecting through a surface of the base into the conductive layer.

According to the above-described configuration, the surface of the insulating layer is roughened by projection of the inorganic particles through the surface of the base into the conductive layer. Thus, the insulating layer can have the rough surface dependent on its own configuration. Therefore, the adhesion between the insulating layer and the conductive layer can be increased.

The surface of the insulating layer can be roughened independently of the surface roughness of the other layer.

Other features, elements, characteristics and advantages of the present disclosure will become more apparent from the following detailed description of preferred embodiments of the present disclosure with reference to the attached drawings.

DETAILED DESCRIPTION

Figure 1:
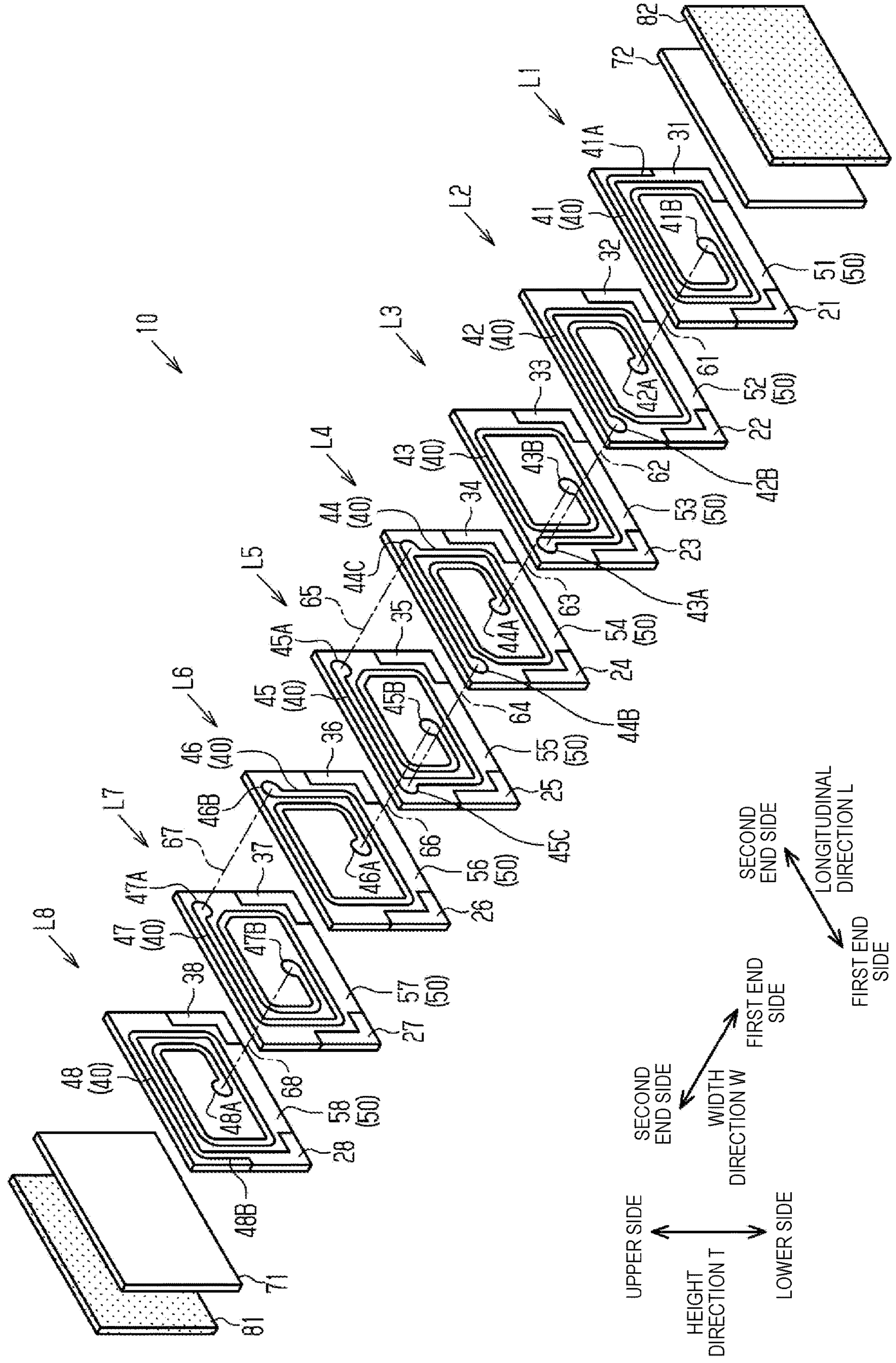
FIG. 1 is an exploded perspective view of an inductor component.

An embodiment of an inductor component is described below. For facilitating the understanding, constituent elements may be illustrated with enlarged dimensions in the drawings. The dimensional ratios of the constituent elements may differ from real ones or ones in a different drawing.

As illustrated in FIG. 1, an inductor component 10 has a structure in which a plurality of planar layers are laminated as a whole. Each of the layers has a substantially rectangular shape in plan view. In the following description, a direction of a normal line orthogonal to a plane direction of the plurality of layers is described as a width direction W. A direction in which the long sides of each of the layers having the substantially rectangular shape in plan view extend is defined as a length direction L, and a direction in which its short sides extend is defined as a height direction T.

Figure 2:
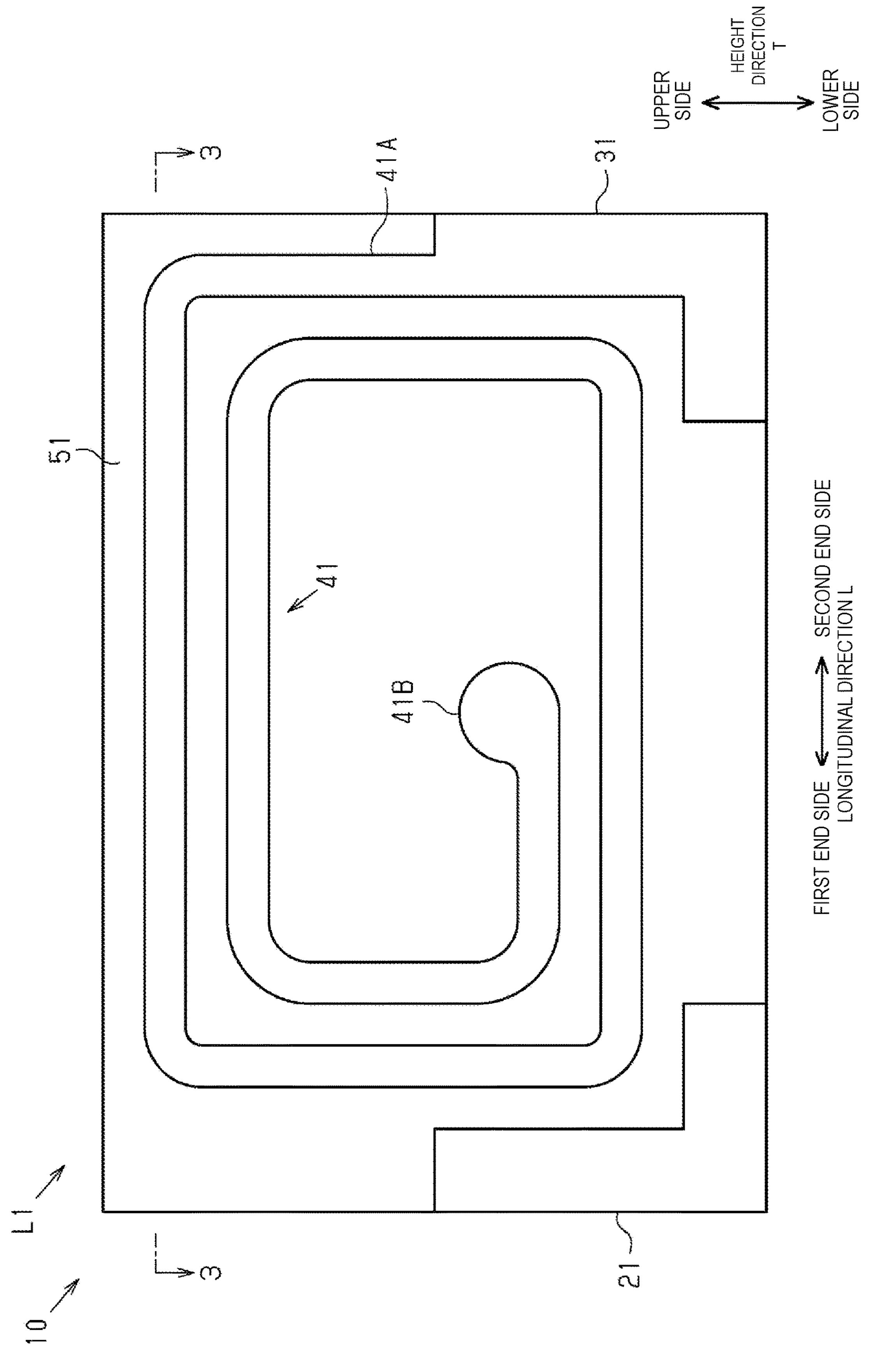
FIG. 2 is a plan view of a first layer.

As illustrated in FIG. 2, a first layer L1 includes a first electrode layer 21, a second electrode layer 31, first inductor wiring 41, and a first insulating layer 51.

The first electrode layer 21 is made of a conductive material and has a substantially L shape as a whole. The first electrode layer 21 is arranged on a corner among the four corners of the first layer L1 having the substantially rectangular shape in plan view, the corner positioned on a first end side in the length direction L and being lower in the height direction T. The first electrode layer 21 is exposed to the outside of the first layer L1 in a section lower in the height direction T with respect to substantially the center of the short side on the first end side in the length direction L and in a section on the first end side in the length direction L with respect to substantially the center of the lower long side in the height direction T among the four sides of the first layer L1 having the substantially rectangular shape in plan view.

The second electrode layer 31 is made of a conductive material and has a substantially L shape as a whole. The second electrode layer 31 is arranged on a corner among the four corners of the first layer L1 having the substantially rectangular shape in plan view, the corner positioned on a second end side in the length direction L and being lower in the height direction T. Accordingly, the second electrode layer 31 has a substantially L shape symmetrical with the first electrode layer 21 in the length direction L. The second electrode layer 31 is exposed to the outside of the first layer L1 in a section lower in the height direction T with respect to substantially the center of the short side on the second end side in the length direction L and in a section on the second end side in the length direction L with respect to substantially the center of the lower long side in the height direction T among the four sides of the first layer L1 having the substantially rectangular shape in plan view.

As illustrated in FIG. 1, the first inductor wiring 41 is made of a conductive material and extends in a spiral shape whose center is substantially the center of the first layer L1 having the substantially rectangular shape in plan view as a whole. Specifically, as illustrated in FIG. 2, a first end portion 41A of the first inductor wiring 41 is connected to an upper end in the height direction T of the second electrode layer 31. The wiring width of the first inductor wiring 41 is approximately the same, except for its second end portion, and is smaller than the wiring width of the second electrode layer 31. In the first inductor wiring 41, sections linearly extending along the sides of the first layer L1 having the substantially rectangular shape in plan view and sections turning about 90 degrees are alternately positioned. As seen from the first end side in the width direction W, the first inductor wiring 41 is spirally wound counterclockwise from the first end portion 41A, which is the outer side portion in the diameter direction, toward a second end portion 41B, which is the inner side portion in the diameter direction. The first inductor wiring 41 is exposed to the outside of the first layer L1 on its both sides in the width direction W.

The number of turns of the first inductor wiring 41 is determined based on a virtual vector. The starting point of the virtual vector is arranged on a virtual center line extending through substantially the center of the wiring width of the first inductor wiring 41 along the extending direction of the first inductor wiring 41. The virtual vector is in contact with the virtual center line extending along the extending direction of the first inductor wiring 41 as seen from the width direction W. Here, when the starting point of the virtual vector moves from a first end of the virtual center line to a second end of the virtual center line, the number of turns in a state where the angle of rotation of the end point of the virtual vector is about 360 degrees is defined as 1.0. Accordingly, in a state where it is wound about 180 degrees, the number of turns is 0.5. In the present embodiment, the end point of the virtual vector virtually arranged on the first inductor wiring 41 is rotated about 540 degrees. Thus, the number of turns of the first inductor wiring 41 is 1.5 in the present embodiment.

The second end portion 41B of the first inductor wiring 41 functions as a pad and has a substantially circular shape in plan view. The wiring width of the second end portion 41B of the first inductor wiring 41 is larger than that of the other portion of the first inductor wiring 41.

The portion other than the first electrode layer 21, the second electrode layer 31, and the first inductor wiring 41 in the first layer L1 is the first insulating layer 51, which is an insulator.

Although not illustrated in FIG. 1, an insulator layer is laminated on the second end side in the width direction W of the first layer L1. That insulator layer has the same substantially rectangular shape as that of the first layer L1 in plan view. That insulator layer is mostly the insulator and has a first via 61 made of a conductive material disposed in a position corresponding to the second end portion 41B of the first inductor wiring 41 in the first layer L1. The first via 61 has a substantially circular shape in plan view and is connected to the second end portion 41B of the first inductor wiring 41 in the first layer L1. In FIG. 1, a connection relation between different wiring elements by the first via 61 is virtually indicated by the dash-dot line. In that insulator layer, a via made of a conductive material is disposed in each of a position corresponding to the first electrode layer 21 in the first layer L1 and a position corresponding to the second electrode layer 31.

A second layer L2 having the same substantially rectangular shape in plan view as that of the first layer L1 is laminated on the second end side in the width direction W of the layer including the first via 61. The second layer L2 includes a third electrode layer 22, a fourth electrode layer 32, second inductor wiring 42, and a second insulating layer 52.

The third electrode layer 22 is made of the same material as that of the first electrode layer 21, has the same shape as that of the first electrode layer 21, and is arranged on the second end side in the width direction W of the first electrode layer 21. The fourth electrode layer 32 is made of the same material as that of the second electrode layer 31, has the same shape as that of the second electrode layer 31, and is arranged on the second end side in the width direction W of the second electrode layer 31.

The second inductor wiring 42 is made of a conductive material and extends in a spiral shape whose center is substantially the center of the second layer L2 having the substantially rectangular shape in plan view as a whole. Specifically, a first end portion 42A of the second inductor wiring 42 is arranged on the second end side in the width direction W of the first via 61. In the second inductor wiring 42, sections linearly extending along the sides of the second layer L2 having the substantially rectangular shape in plan view and sections turning about 90 degrees are alternately positioned. As seen from the first end side in the width direction W, the second inductor wiring 42 is spirally wound counterclockwise from the first end portion 42A, which is the inner side portion in the diameter direction, toward a second end portion 42B, which is the outer side portion in the diameter direction. The second inductor wiring 42 is exposed to the outside of the second layer L2 on its both sides in the width direction W.

The number of turns of the second inductor wiring 42 is 1.5 as a whole. The wiring width of each of the first end portion 42A and the second end portion 42B of the second inductor wiring 42 is larger than that of the portion between the first end portion 42A and the second end portion 42B.

The portion other than the third electrode layer 22, the fourth electrode layer 32, and the second inductor wiring 42 in the second layer L2 is the second insulating layer 52, which is an insulator.

Although not illustrated in FIG. 1, an insulator layer is laminated on the second end side in the width direction W of the second layer L2. That insulator layer has the same substantially rectangular shape as that of the second layer L2 in plan view. That insulator layer is mostly the insulator and has a second via 62 made of a conductive material disposed in a position corresponding to the second end portion 42B of the second inductor wiring 42 in the second layer L2. The second via 62 has a substantially circular shape in plan view and is connected to the second end portion 42B of the second inductor wiring 42 in the second layer L2. In FIG. 1, a connection relation between different wiring elements by the second via 62 is virtually indicated by the dash-dot line. In that insulator layer, a via made of a conductive material is disposed in each of a position corresponding to the third electrode layer 22 in the second layer L2 and a position corresponding to the fourth electrode layer 32.

A third layer L3 having the same substantially rectangular shape in plan view as that of the second layer L2 is laminated on the second end side in the width direction W of the layer including the second via 62. The third layer L3 includes a fifth electrode layer 23, a sixth electrode layer 33, third inductor wiring 43, and a third insulating layer 53.

The fifth electrode layer 23 is made of the same material as that of the third electrode layer 22, has the same shape as that of the third electrode layer 22, and is arranged on the second end side in the width direction W of the third electrode layer 22. The sixth electrode layer 33 is made of the same material as that of the fourth electrode layer 32, has the same shape as that of the fourth electrode layer 32, and is arranged on the second end side in the width direction W of the fourth electrode layer 32.

The third inductor wiring 43 is made of a conductive material and extends in a spiral shape whose center is substantially the center of the third layer L3 having the substantially rectangular shape in plan view as a whole. Specifically, a first end portion 43A of the third inductor wiring 43 is arranged on the second end side in the width direction W of the second via 62. In the third inductor wiring 43, sections linearly extending along the sides of the third layer L3 having the substantially rectangular shape in plan view and sections turning about 90 degrees are alternately positioned. As seen from the first end side in the width direction W, the third inductor wiring 43 is spirally wound counterclockwise from the first end portion 43A, which is the outer side portion in the diameter direction, toward a second end portion 43B, which is the inner side portion in the diameter direction. The third inductor wiring 43 is exposed to the outside of the third layer L3 on its both sides in the width direction W.

The number of turns of the third inductor wiring 43 is 1.5 as a whole. The wiring width of each of the first end portion 43A and the second end portion 43B of the third inductor wiring 43 is larger than that of the portion between the first end portion 43A and the second end portion 43B.

The portion other than the fifth electrode layer 23, the sixth electrode layer 33, and the third inductor wiring 43 in the third layer L3 is the third insulating layer 53, which is an insulator.

Although not illustrated in FIG. 1, an insulator layer is laminated on the second end side in the width direction W of the third layer L3. That insulator layer has the same substantially rectangular shape as that of the third layer L3 in plan view. That insulator layer is mostly the insulator and has a third via 63 made of a conductive material disposed in a position corresponding to the second end portion 43B of the third inductor wiring 43 in the third layer L3. The third via 63 has a substantially circular shape in plan view and is connected to the second end portion 43B of the third inductor wiring 43 in the third layer L3. In FIG. 1, a connection relation between different wiring elements by the third via 63 is virtually indicated by the dash-dot line. In that insulator layer, a via made of a conductive material is disposed in each of a position corresponding to the fifth electrode layer 23 in the third layer L3 and a position corresponding to the sixth electrode layer 33.

A fourth layer L4 having the same substantially rectangular shape in plan view as that of the third layer L3 is laminated on the second end side in the width direction W of the layer including the third via 63. The fourth layer L4 includes a seventh electrode layer 24, an eighth electrode layer 34, fourth inductor wiring 44, and a fourth insulating layer 54.

The seventh electrode layer 24 is made of the same material as that of the fifth electrode layer 23, has the same shape as that of the fifth electrode layer 23, and is arranged on the second end side in the width direction W of the fifth electrode layer 23. The eighth electrode layer 34 is made of the same material as that of the sixth electrode layer 33, has the same shape as that of the sixth electrode layer 33, and is arranged on the second end side in the width direction W of the sixth electrode layer 33.

The fourth inductor wiring 44 is made of a conductive material and extends in a spiral shape whose center is substantially the center of the fourth layer L4 having the substantially rectangular shape in plan view as a whole. Specifically, a first end portion 44A of the fourth inductor wiring 44 is arranged on the second end side in the width direction W of the third via 63. In the fourth inductor wiring 44, sections linearly extending along the sides of the fourth layer L4 having the substantially rectangular shape in plan view and sections turning about 90 degrees are alternately positioned. As seen from the first end side in the width direction W, the fourth inductor wiring 44 is spirally wound counterclockwise from the first end portion 44A, which is the inner side portion in the diameter direction, toward a second end portion 44B, which is the outer side portion in the diameter direction. The fourth inductor wiring 44 is exposed to the outside of the fourth layer L4 on its both sides in the width direction W.

The number of turns of the fourth inductor wiring 44 is 1.5 as a whole. A first intermediate pad 44C is arranged between the first end portion 44A and the second end portion 44B of the fourth inductor wiring 44. The first intermediate pad 44C is arranged in a location where the fourth inductor wiring 44 turns about 495 degrees from the first end portion 44A. That is, the location of the first intermediate pad 44C is in the vicinity of a corner among the four corners of the fourth layer L4 having the substantially rectangular shape in plan view, the corner positioned on the second end side in the length direction L and being upper in the height direction T, and is in the outer side portion in the diameter direction in the fourth inductor wiring 44. The portion between the first intermediate pad 44C and the second end portion 44B is linear. The wiring width of each of the first end portion 44A, the second end portion 44B, and the first intermediate pad 44C of the fourth inductor wiring 44 is larger than that of the other portion of the fourth inductor wiring 44.

The portion other than the seventh electrode layer 24, the eighth electrode layer 34, and the fourth inductor wiring 44 in the fourth layer L4 is the fourth insulating layer 54, which is an insulator.

Although not illustrated in FIG. 1, an insulator layer is laminated on the second end side in the width direction W of the fourth layer L4. That insulator layer has the same substantially rectangular shape as that of the fourth layer L4 in plan view. That insulator layer is mostly the insulator and has a fourth via 64 made of a conductive material disposed in a position corresponding to the second end portion 44B of the fourth inductor wiring 44 in the fourth layer L4. The fourth via 64 has a substantially circular shape in plan view and is connected to the second end portion 44B of the fourth inductor wiring 44 in the fourth layer L4. That insulator layer further has a fifth via 65 made of a conductive material disposed in a position corresponding to the first intermediate pad 44C of the fourth inductor wiring 44 in the fourth layer L4. The fifth via 65 has a substantially circular shape in plan view and is connected to the first intermediate pad 44C of the fourth inductor wiring 44 in the fourth layer L4. In FIG. 1, connection relations between different wiring elements by the fourth via 64 and the fifth via 65 are virtually indicated by the dash-dot lines. In that insulator layer, a via made of a conductive material is disposed in each of a position corresponding to the seventh electrode layer 24 in the fourth layer L4 and a position corresponding to the eighth electrode layer 34.

A fifth layer L5 having the same substantially rectangular shape in plan view as that of the fourth layer L4 is laminated on the second end side in the width direction W of the layer including the fourth via 64 and the fifth via 65. The fifth layer L5 includes a ninth electrode layer 25, a tenth electrode layer 35, fifth inductor wiring 45, and a fifth insulating layer 55.

The ninth electrode layer 25 is made of the same material as that of the seventh electrode layer 24, has the same shape as that of the seventh electrode layer 24, and is arranged on the second end side in the width direction W of the seventh electrode layer 24. The tenth electrode layer 35 is made of the same material as that of the eighth electrode layer 34, has the same shape as that of the eighth electrode layer 34, and is arranged on the second end side in the width direction W of the eighth electrode layer 34.

The fifth inductor wiring 45 is made of a conductive material and extends in a spiral shape whose center is substantially the center of the fifth layer L5 having the substantially rectangular shape in plan view as a whole. Specifically, a first end portion 45A of the fifth inductor wiring 45 is arranged on the second end side in the width direction W of the fifth via 65. In the fifth inductor wiring 45, sections linearly extending along the sides of the fifth layer L5 having the substantially rectangular shape in plan view and sections turning about 90 degrees are alternately positioned. As seen from the first end side in the width direction W, the fifth inductor wiring 45 is spirally wound counterclockwise from the first end portion 45A, which is the outer side portion in the diameter direction, toward a second end portion 45B, which is the inner side portion in the diameter direction. The fifth inductor wiring 45 is exposed to the outside of the fifth layer L5 on its both sides in the width direction W.

The number of turns of the fifth inductor wiring 45 is 1.5 as a whole. A second intermediate pad 45C is arranged between the first end portion 45A and the second end portion 45B of the fifth inductor wiring 45. The second intermediate pad 45C is arranged on the second end side in the width direction W of the fourth via 64. The portion between the second intermediate pad 45C and the first end portion 45A is linear. The wiring width of each of the first end portion 45A, the second end portion 45B, and the second intermediate pad 45C of the fifth inductor wiring 45 is larger than that of the other portion of the fifth inductor wiring 45.

The portion other than the ninth electrode layer 25, the tenth electrode layer 35, and the fifth inductor wiring 45 in the fifth layer L5 is the fifth insulating layer 55, which is an insulator.

Although not illustrated in FIG. 1, an insulator layer is laminated on the second end side in the width direction W of the fifth layer L5. That insulator layer has the same substantially rectangular shape as that of the fifth layer L5 in plan view. That insulator layer is mostly the insulator and has a sixth via 66 made of a conductive material disposed in a position corresponding to the second end portion 45B of the fifth inductor wiring 45 in the fifth layer L5. The sixth via 66 has a substantially circular shape in plan view and is connected to the second end portion 45B of the fifth inductor wiring 45 in the fifth layer L5. In FIG. 1, a connection relation between different wiring elements by the sixth via 66 is virtually indicated by the dash-dot line. In that insulator layer, a via made of a conductive material is disposed in each of a position corresponding to the ninth electrode layer 25 in the fifth layer L5 and a position corresponding to the tenth electrode layer 35.

A sixth layer L6 having the same substantially rectangular shape in plan view as that of the fifth layer L5 is laminated on the second end side in the width direction W of the layer including the sixth via 66. The sixth layer L6 includes an 11th electrode layer 26, a 12th electrode layer 36, sixth inductor wiring 46, and a sixth insulating layer 56.

The 11th electrode layer 26 is made of the same material as that of the ninth electrode layer 25, has the same shape as that of the ninth electrode layer 25, and is arranged on the second end side in the width direction W of the ninth electrode layer 25. The 12th electrode layer 36 is made of the same material as that of the tenth electrode layer 35, has the same shape as that of the tenth electrode layer 35, and is arranged on the second end side in the width direction W of the tenth electrode layer 35.

The sixth inductor wiring 46 is made of a conductive material and extends in a spiral shape whose center is substantially the center of the sixth layer L6 having the substantially rectangular shape in plan view as a whole. Specifically, a first end portion 46A of the sixth inductor wiring 46 is arranged on the second end side in the width direction W of the sixth via 66. In the sixth inductor wiring 46, sections linearly extending along the sides of the sixth layer L6 having the substantially rectangular shape in plan view and sections turning about 90 degrees are alternately positioned. As seen from the first end side in the width direction W, the sixth inductor wiring 46 is spirally wound counterclockwise from the first end portion 46A, which is the inner side portion in the diameter direction, toward a second end portion 46B, which is the outer side portion in the diameter direction. The sixth inductor wiring 46 is exposed to the outside of the sixth layer L6 on its both sides in the width direction W.

The number of turns of the sixth inductor wiring 46 is 1.5 as a whole. The wiring width of each of the first end portion 46A and the second end portion 46B of the sixth inductor wiring 46 is larger than that of the portion between the first end portion 46A and the second end portion 46B.

The portion other than the 11th electrode layer 26, the 12th electrode layer 36, and the sixth inductor wiring 46 in the sixth layer L6 is the sixth insulating layer 56, which is an insulator.

Although not illustrated in FIG. 1, an insulator layer is laminated on the second end side in the width direction W of the sixth layer L6. That insulator layer has the same substantially rectangular shape as that of the sixth layer L6 in plan view. That insulator layer is mostly the insulator and has a seventh via 67 made of a conductive material disposed in a position corresponding to the second end portion 46B of the sixth inductor wiring 46 in the sixth layer L6. The seventh via 67 has a substantially circular shape in plan view and is connected to the second end portion 46B of the sixth inductor wiring 46 in the sixth layer L6. In FIG. 1, a connection relation between different wiring elements by the seventh via 67 is virtually indicated by the dash-dot line. In that insulator layer, a via made of a conductive material is disposed in each of a position corresponding to the 11th electrode layer 26 in the sixth layer L6 and a position corresponding to the 12th electrode layer 36.

A seventh layer L7 having the same substantially rectangular shape in plan view as that of the sixth layer L6 is laminated on the second end side in the width direction W of the layer including the seventh via 67. The seventh layer L7 includes a 13th electrode layer 27, a 14th electrode layer 37, seventh inductor wiring 47, and a seventh insulating layer 57.

The 13th electrode layer 27 is made of the same material as that of the 11th electrode layer 26, has the same shape as that of the 11th electrode layer 26, and is arranged on the second end side in the width direction W of the 11th electrode layer 26. The 14th electrode layer 37 is made of the same material as that of the 12th electrode layer 36, has the same shape as that of the 12th electrode layer 36, and is arranged on the second end side in the width direction W of the 12th electrode layer 36.

The seventh inductor wiring 47 is made of a conductive material and extends in a spiral shape whose center is substantially the center of the seventh layer L7 having the substantially rectangular shape in plan view as a whole. Specifically, a first end portion 47A of the seventh inductor wiring 47 is arranged on the second end side in the width direction W of the seventh via 67. In the seventh inductor wiring 47, sections linearly extending along the sides of the seventh layer L7 having the substantially rectangular shape in plan view and sections turning about 90 degrees are alternately positioned. As seen from the first end side in the width direction W, the seventh inductor wiring 47 is spirally wound counterclockwise from the first end portion 47A, which is the outer side portion in the diameter direction, toward a second end portion 47B, which is the inner side portion in the diameter direction. The seventh inductor wiring 47 is exposed to the outside of the seventh layer L7 on its both sides in the width direction W.

The number of turns of the seventh inductor wiring 47 is 1.5 as a whole. The wiring width of each of the first end portion 47A and the second end portion 47B of the seventh inductor wiring 47 is larger than that of the portion between the first end portion 47A and the second end portion 47B.

The portion other than the 13th electrode layer 27, the 14th electrode layer 37, and the seventh inductor wiring 47 in the seventh layer L7 is the seventh insulating layer 57, which is an insulator.

Although not illustrated in FIG. 1, an insulator layer is laminated on the second end side in the width direction W of the seventh layer L7. That insulator layer has the same substantially rectangular shape as that of the seventh layer L7 in plan view. That insulator layer is mostly the insulator and has an eighth via 68 made of a conductive material disposed in a position corresponding to the second end portion 47B of the seventh inductor wiring 47 in the seventh layer L7. The eighth via 68 has a substantially circular shape in plan view and is connected to the second end portion 47B of the seventh inductor wiring 47 in the seventh layer L7. In FIG. 1, a connection relation between different wiring elements by the eighth via 68 is virtually indicated by the dash-dot line. In that insulator layer, a via made of a conductive material is disposed in each of a position corresponding to the 13th electrode layer 27 in the seventh layer L7 and a position corresponding to the 14th electrode layer 37.

An eighth layer L8 having the same substantially rectangular shape in plan view as that of the seventh layer L7 is laminated on the second end side in the width direction W of the layer including the eighth via 68. The eighth layer L8 includes a 15th electrode layer 28, a 16th electrode layer 38, eighth inductor wiring 48, and an eighth insulating layer 58.

The 15th electrode layer 28 is made of the same material as that of the 13th electrode layer 27, has the same shape as that of the 13th electrode layer 27, and is arranged on the second end side in the width direction W of the 13th electrode layer 27. The 16th electrode layer 38 is made of the same material as that of the 14th electrode layer 37, has the same shape as that of the 14th electrode layer 37, and is arranged on the second end side in the width direction W of the 14th electrode layer 37.

The eighth inductor wiring 48 is made of a conductive material and extends in a spiral shape whose center is substantially the center of the eighth layer L8 having the substantially rectangular shape in plan view as a whole. Specifically, a first end portion 48A of the eighth inductor wiring 48 is arranged on the second end side in the width direction W of the eighth via 68. In the eighth inductor wiring 48, sections linearly extending along the sides of the eighth layer L8 having the substantially rectangular shape in plan view and sections turning about 90 degrees are alternately positioned. As seen from the first end side in the width direction W, the eighth inductor wiring 48 is spirally wound counterclockwise from the first end portion 48A, which is the inner side portion in the diameter direction, toward a second end portion 48B, which is the outer side portion in the diameter direction. The second end portion 48B of the eighth inductor wiring 48 is connected to an upper end in the height direction T of the 15th electrode layer 28. The eighth inductor wiring 48 is exposed to the outside of the eighth layer L8 on its both sides in the width direction W.

The portion other than the 15th electrode layer 28, the 16th electrode layer 38, and the eighth inductor wiring 48 in the eighth layer L8 is the eighth insulating layer 58, which is an insulator.

Although not illustrated, a first outer electrode is connected to outer surfaces on the first end side in the length direction L and outer surfaces on the lower side in the height direction T of the first electrode layer 21, the third electrode layer 22, the fifth electrode layer 23, the seventh electrode layer 24, the ninth electrode layer 25, the 11th electrode layer 26, the 13th electrode layer 27, and the 15th electrode layer 28.

Moreover, although not illustrated, a second outer electrode is connected to outer surfaces on the second end side in the length direction L and outer surfaces on the lower side in the height direction T of the second electrode layer 31, the fourth electrode layer 32, the sixth electrode layer 33, the eighth electrode layer 34, the tenth electrode layer 35, the 12th electrode layer 36, the 14th electrode layer 37, and the 16th electrode layer 38.

A first covering insulating layer 71 having the same substantially rectangular shape in plan view as that of the eighth layer L8 is laminated on the second end side in the width direction W of the eighth layer L8. A first marker layer 81 having the same substantially rectangular shape in plan view as that of the first covering insulating layer 71 is laminated on the second end side in the width direction W of the first covering insulating layer 71. The color of the first marker layer 81 differs from that of the first covering insulating layer 71.

A second covering insulating layer 72 having the same substantially rectangular shape in plan view as that of the first layer L1 is laminated on the first end side in the width direction W of the first layer L1. A second marker layer 82 having the same substantially rectangular shape in plan view as that of the second covering insulating layer 72 is laminated on the first end side in the width direction W of the second covering insulating layer 72. The color of the second marker layer 82 differs from that of the second covering insulating layer 72.

Figure 3:
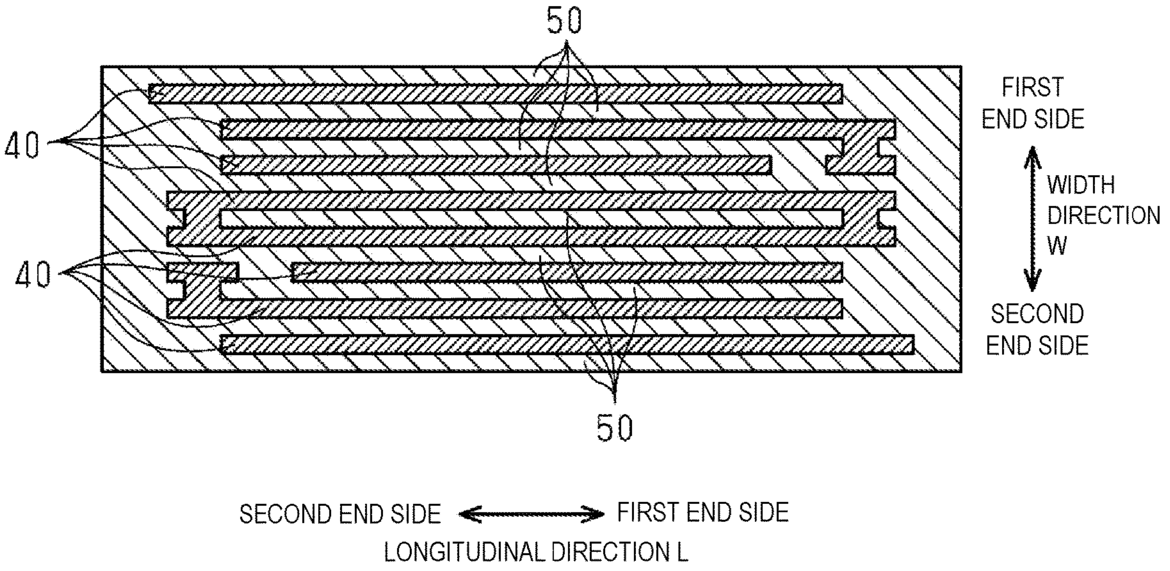
FIG. 3 is a cross-sectional view of the inductor component.

The above-described first insulating layer 51 to seventh insulating layer 57, first covering insulating layer 71, second covering insulating layer 72, and insulator sections in the layers between neighboring ones of the first layer L1 to eighth layer L8 are made of the same material. When it is not necessary to distinguish them, they are collectively referred to as insulating layers 50 in the following description. The first inductor wiring 41 to eighth inductor wiring 48 are made of the same material. When it is not necessary to distinguish them, they are collectively referred to as conductive layers 40 in the following description. Thus, as illustrated in FIG. 3, which illustrates a cross section of the inductor component 10, the conductive layers 40 and the insulating layers 50 are alternately laminated in the width direction W, which is the lamination direction of the layers. In the present embodiment, the first inductor wiring 41 and the second electrode layer 31 are integral with each other, and no interface is present between them. The eighth inductor wiring 48 and the 15th electrode layer 28 are integral with each other, and no interface is present between them.

Figure 4:
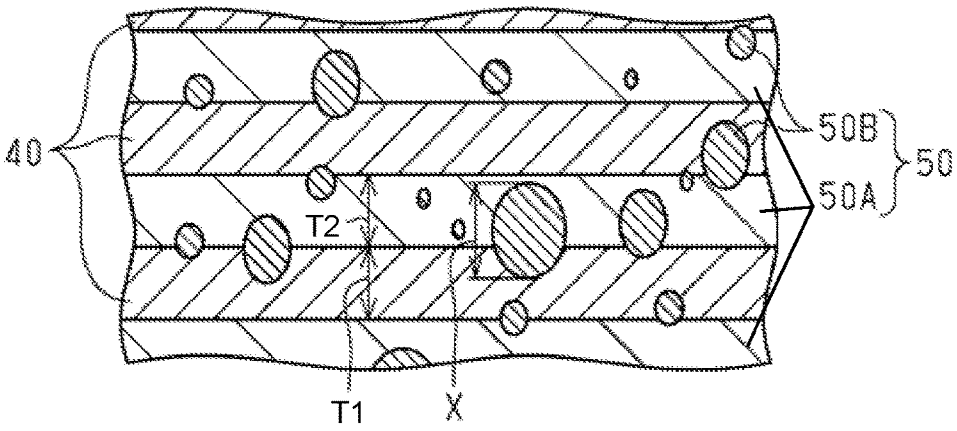
FIG. 4 is an enlarged cross-sectional view of the inductor component.

As illustrated in FIG. 4, each of the insulating layers 50 includes a base 50A and inorganic particles 50B. In the present embodiment, the base 50A is glass, and the inorganic particles 50B are alumina particles. The inorganic particles 50B are dispersed in the base 50A. Some of the inorganic particles 50B partially project through the surface of the base 50A into the conductive layer 40. Each of the thickness T1 of the conductive layer 40 and the thickness T2 of the insulating layer 50 is within the range of about 4 μm to about 20 μm. In the present embodiment, the thickness T1 of the conductive layer 40 is about 7.5 μm, and the thickness T2 of the insulating layer 50 is about 7.5 μm. The maximum particle diameter X of the inorganic particles 50B is not larger than about 10 μm. That is, the maximum particle diameter X of the inorganic particles 50B is not larger than about ⅔ of the sum of the thickness T1 of the conductive layer 40 and the thickness T2 of the insulating layer 50. In the present embodiment, the thickness T2 of the insulating layer 50 is the thickness of the base 50A.

Here, the maximum particle diameter X of the inorganic particles 50B is the maximum value of the particle diameters of the inorganic particles 50B within a single cross section in which the longest continuously exposed conductive layer 40 is present among cross sections along the lamination direction of the first layer L1 to eighth layer L8 when that cross section is observed by using an electron microscope. The observed portion in the observation is an observation surface in a SEM image of a region of about 60 μm×about 60 μm centered on a substantially central section in a direction in which the wiring extends of a portion of a single longest continuously exposed conductive layer 40 observed with a magnification of 1500×. In the present embodiment, an observation surface of a region of about 60 μm×about 60 μm centered on substantially the midpoint between the second end portion 44B and the first intermediate pad 44C of the fourth inductor wiring 44 is used. If a plurality of particles link together, they are regarded as a single particle. Thus, for example, if many fine particles aggregate into a mass, the particle diameter of the mass in the aggregated state is measured as a single particle.

In the present embodiment, as illustrated in FIG. 1, measurement is performed on a cross section that includes a linear segment extending from the second end portion 44B to the first intermediate pad 44C of the fourth inductor wiring 44 in the fourth layer L4. Specifically, as seen from the width direction W, the upper surface in the height direction T is cut downward in the height direction T up to the location where the second end portion 44B and the first intermediate pad 44C of the fourth inductor wiring 44 are present, and measurement is performed at an observation surface exposed such that the eight conductive layers 40 are arranged approximately in parallel with each other, as illustrated in FIG. 4.

An example method for measuring the particle diameter of the inorganic particles 50B may be elemental mapping for aluminium by energy-dispersive X-ray spectrometry (EDX) analysis on the above-described observation surface.

Next, the actions and advantages of the above-described embodiment are described.

(1) According to the above-described embodiment, the conductive layers 40 and the insulating layers 50 are laminated, some of the inorganic particles 50B partially project through the base 50A in each of the insulating layers 50, and that leads to the irregularities of the surface of the insulating layers 50 as a whole. Thus, the area where the conductive layer 40 and the insulating layer 50 are in contact with each other is increased, the so-called anchor effect occurs in the border between the conductive layer 40 and the insulating layer 50, and thus the adhesion between the conductive layer 40 and the insulating layer 50 can be increased.

(2) According to the above-described embodiment, the maximum particle diameter X of the inorganic particles 50B is not larger than about ⅔ of the sum of the thickness T1 of the conductive layer 40 and the thickness T2 of the insulating layer 50. Therefore, local excessive reduction in the thickness of the location in the conductive layer 40 where the inorganic particles 50B exist caused by excessive projection of the inorganic particles 50B into the conductive layer 40 can be suppressed.

(3) According to the above-described embodiment, both of the thickness T1 of the conductive layer 40 and the thickness T2 of the insulating layer 50 is about 7.5 μm, which is within the range of about 4 μm to about 20 μm. Therefore, when the thickness of the inductor component 10 is fixed, a larger number of layers can be laminated, in comparison with that in the case where the thickness T1 of the conductive layer 40 and the thickness T2 of the insulating layer 50 are large, and thus the inductance can be more easily enhanced. Additionally, in comparison with the case where each of the thickness T1 of the conductive layer 40 and the thickness T2 of the insulating layer 50 is excessively small, variations during manufacture and the occurrence of breaks in the extending direction of layers caused by the effects during mounting can be more suppressed.

The above-described embodiment can be changed as described below. The above-described embodiment and example modifications below can be combined within a range where no technical contradiction arises.

In the above-described embodiment, the inductor wiring is merely wiring capable of providing the inductor component with inductance by producing a magnetic flux when a current flows therethrough. Therefore, the number of turns and the manner of the turns of the inductor wiring are not limited to the example in the above-described embodiment. In one example, the inductor wiring may have a helical shape of a three-dimensional spiral with less than one turn per layer. In another example, the inductor wiring may have a linear or meandering shape.

In the above-described embodiment, the shape of the inductor component 10 is not limited to the example in the above-described embodiment. The shape as a whole may be substantially cylindrical, substantially polygonal, or substantially spherical.

In the above-described embodiment, the inorganic particles 50B partially project into at least one conductive layer 40 from the base 50A in its neighboring insulating layer 50. It may be preferred that the inorganic particles 50B partially project into all of the conductive layers 40 from the bases 50A in their neighboring insulating layers 50.

In the above-described embodiment, the maximum particle diameter X of the inorganic particles 50B is not larger than about ⅔ of the sum of the thickness T1 of the conductive layer 40 and the thickness T2 of the insulating layer 50 for at least one conductive layers 40 and its neighboring insulating layer 50. It may be preferred that the maximum particle diameter X of the inorganic particles 50B is not larger than about ⅔ of the sum of the thickness T1 of the conductive layer 40 and the thickness T2 of the insulating layer 50 for all of the conductive layers 40 and their neighboring insulating layers 50.

In the above-described embodiment, the thickness T1 of the conductive layer 40 and the thickness T2 of the insulating layer 50 are not smaller than about 4 μm and not larger than about 20 μm (i.e., from about 4 μm to about 20 μm) for at least one conductive layer 40 and its neighboring insulating layer 50. It may be preferred that the thicknesses T1 of all of the conductive layers 40 and the thicknesses T2 of all of the insulating layers 50 are not smaller than about 4 μm and not larger than about 20 μm (i.e., from about 4 μm to about 20 μm).

In the above-described embodiment, the number of the conductive layers 40 and the number of the insulating layers 50 are not limited to the example in the above-described embodiment. At least one conductive layer 40 and at least one insulating layer 50 are included.

In the above-described embodiment, the configuration of the electrode layers is not limited to the example in the above-described embodiment. In one example, the first outer electrode may be connected directly to the second end portion 48B of the eighth inductor wiring 48, the second outer electrode may be connected directly to the first end portion 41A of the first inductor wiring 41, and the electrode layers may be omitted. The electrode layers may not be connected by vias. Moreover, the shape of each of the electrode layers is not limited to the example in the above-described embodiment. In one example, the electrode layer may have a substantially rod form arranged on only an end surface substantially perpendicular to the length direction L or only a side surface substantially perpendicular to the height direction T or width direction W. In another example, the electrode layer may extend from the lower surface in the height direction T through a side surface substantially perpendicular to the length direction L to the upper surface in the height direction T.

In the above-described embodiment, an interface may be present between the first inductor wiring 41 and the second electrode layer 31. That is, the first inductor wiring 41 and the second electrode layer 31 may not be integral with each other, and both may be configured as separate elements. Similarly, an interface may be present between the eighth inductor wiring 48 and the 15th electrode layer 28. That is, the eighth inductor wiring 48 and the 15th electrode layer 28 may not be integral with each other, and both may be configured as separate elements.

In the above-described embodiment, the material of the base 50A may be resin or any other materials from which necessary insulating properties are obtainable. When the material of the base 50A is one that can provide a relatively smooth surface, such as resin or glass, the advantage from the projection of the inorganic particles 50B through the surface of the base 50A is easily obtainable.

In the above-described embodiment, the material of the inorganic particles 50B is not limited to alumina particles. They may be any insulator, for example, ceramic particles or glass particles.

In the above-described embodiment, the maximum particle diameter X of the inorganic particles 50B is not limited to the example in the above-described embodiment. The maximum particle diameter X of the inorganic particles 50B may be any value at which at least some of the inorganic particles 50B partially project through the surface of the base 50A into the conductive layer 40.

In the above-described embodiment, the thickness T1 of the conductive layer 40 and the thickness T2 of the insulating layer 50 are not limited to the example in the above-described embodiment. When they are within the range of about 4 μm to about 20 μm, the inductance of the inductor component 10 can be easily increased correspondingly. They may be less than about 4 μm or more than about 20 μm.

In the above-described embodiment, the thickness T1 of the conductive layer 40 and the thickness T2 of the insulating layer 50 may be different. In that case, if the thickness T1 of the conductive layer 40 is more than the thickness T2 of the insulating layer 50, the occurrence of breaks in the extending direction of the conductive layer 40 can be easily suppressed.

In the above-described embodiment, the first marker layer 81 and the second marker layer 82 may be omitted.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:

a lamination of an insulating layer and a conductive layer, wherein the insulating layer includes a base made of an insulating material and inorganic particles dispersed in the base, and at least some of the inorganic particles partially project through a surface of the base into the conductive layer, and at least some of the partially projecting inorganic particles extend at least half a thickness of the inorganic particle into the conductive layer.

2. The inductor component according to claim 1, wherein a maximum particle diameter of the inorganic particles is not larger than about ⅔ of a sum of a thickness of the base and a thickness of the conductive layer.

3. The inductor component according to claim 1, wherein the thickness of the conductive layer and the thickness of the base are from about 4 μm to about 20 μm.

4. The inductor component according to claim 2, wherein the thickness of the conductive layer and the thickness of the base are from about 4 μm to about 20 μm.

5. The inductor component according to claim 1, wherein the thickness of the conductive layer and the thickness of the base are the same.

6. The inductor component according to claim 1, wherein the thickness of the conductive layer is about 7.5 μm and the thickness of the base is about 7.5 μm.

7. The inductor component according to claim 1, wherein the thickness of the conductive layer and the thickness of the base are different.

8. The inductor component according to claim 1, wherein a maximum particle diameter of the inorganic particles is not larger than about 10 μm.

9. The inductor component according to claim 1, wherein the thickness of the conductive layer and the thickness of the base are less than about 4 μm or more than about 20 μm.

* * * * *